US012756440B2

(12) United States Patent
Hellgren et al.

(10) Patent No.: US 12,756,440 B2
(45) Date of Patent: Oct. 6, 2026

(54) COVERAGE ANOMALY DETECTION AND OPTIMIZATION IN BEAM MANAGEMENT USING MACHINE LEARNING

(71) Applicant: Telefonaktiebolaget LM Ericsson (publ), Stockholm (SE)

(72) Inventors: Katarina Hellgren, Stockholm (SE); Phiphi Tran, Ängelholm (SE); Marcus Davidsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 264 days.

(21) Appl. No.: 18/556,549

(22) PCT Filed: Apr. 22, 2022

(86) PCT No.: PCT/EP2022/060760
§ 371 (c)(1),
(2) Date: Oct. 20, 2023

(87) PCT Pub. No.: WO2022/223813
PCT Pub. Date: Oct. 27, 2022

(65) Prior Publication Data

US 2024/0195475 A1 Jun. 13, 2024

Related U.S. Application Data

(60) Provisional application No. 63/178,834, filed on Apr. 23, 2021.

(51) Int. Cl.
*H04B 7/02* (2018.01)
*H04B 7/06* (2006.01)

(52) U.S. Cl.
CPC ......... *H04B 7/0617* (2013.01); *H04B 7/0632* (2013.01); *H04B 7/06952* (2023.05)

(58) Field of Classification Search
CPC . H04B 7/0617; H04B 7/06952; H04B 7/0632
(Continued)

(56) References Cited

U.S. PATENT DOCUMENTS

2020/0186227 A1* 6/2020 Reider ................. H04B 7/0626
2021/0336683 A1* 10/2021 Pezeshki .............. H04B 7/0647
2021/0368393 A1* 11/2021 Kotecha ............. H04B 17/3913

FOREIGN PATENT DOCUMENTS

WO 2019029802 A1 2/2019
WO 2020214168 A1 10/2020

OTHER PUBLICATIONS

International Search and Written Opinion dated Aug. 18, 2022 for International Application No. PCT/EP2022/060760 filed Apr. 22, 2022, consisting of 12-pages.

* cited by examiner

*Primary Examiner* — Zewdu A Kassa
(74) *Attorney, Agent, or Firm* — Weisberg I.P. Law, P.A.

(57) ABSTRACT

A mechanism for handling information exchange between a radio network node and a beam model handler includes a first interface providing at least a set of signal property measurements, for a plurality of wireless communication devices being in communication with the radio network node, from the radio network node to the beam model handler, and a second interface providing one or more beam models from the beam model handler to the radio network node. A beam model handler is arranged to create or update beam models based on signal property measurements for a plurality of wireless communication devices being in communication with a radio network node. The beam model handler includes the mechanism for handling information exchange between the radio network node and the beam model handler.

8 Claims, 6 Drawing Sheets

(58) Field of Classification Search
USPC ................ 375/267, 260, 259, 219, 295, 316
See application file for complete search history.

COVERAGE ANOMALY DETECTION AND OPTIMIZATION IN BEAM MANAGEMENT USING MACHINE LEARNING

CROSS-REFERENCE TO RELATED APPLICATIONS

This application is a Submission Under 35 U.S.C. § 371 for U.S. National Stage Patent Application of International Application No.: PCT/EP2022/060760, filed Apr. 22, 2022 entitled "COVERAGE ANOMALY DETECTION AND OPTIMIZATION IN BEAM MANAGEMENT USING MACHINE LEARNING," which claims priority to U.S. Provisional Application No. 63/178,834, filed Apr. 23, 2021, entitled "COVERAGE ANOMALY DETECTION AND OPTIMIZATION IN BEAM MANAGEMENT USING MACHINE LEARNING," the entireties of both of which are incorporated herein by reference.

TECHNICAL FIELD

The present disclosure generally relates to a mechanism for handling information exchange between a radio network node and a beam model handler, a radio network node, a beam model handler, and associated method, and a computer program for implementing the method.

BACKGROUND

The advancements in today's technology has motivated the development of faster mobile communication systems. The fifth generation mobile network, 5G, is the latest progress made by the third generation partnership project (3GPP) and expects to both increase connection speed and reduce latency, which eventually will make it applicable in supporting state-of-the art technologies such as virtual reality (VR), self-driving vehicles and remote surgery at hospitals to name a few. 5G NR (New Radio) is a new radio access technology (RAT) developed by 3GPP for the 5G (fifth generation) mobile network. It is designed to be the global standard for the air interface of 5G networks.

Machine learning (IL) is the study of computer algorithms that improve automatically through experience and by the use of data. It is seen as a part of artificial intelligence. ML algorithms build a model based on sample data, known as "training data", in order to make predictions or decisions without being explicitly programmed to do so. ML algorithms are used in a wide variety of applications, such as email filtering and computer vision, where it is difficult or unfeasible to develop conventional algorithms to perform the needed tasks.

A subset of ML is closely related to computational statistics, which focuses on making predictions using computers; but not all machine learning is statistical learning. The study of mathematical optimization delivers methods, theory and application domains to the field of machine learning. Data mining is a related field of study, focusing on exploratory data analysis through unsupervised learning. In its application across business problems, machine learning is also referred to as predictive analytics.

This disclosure suggests the use of different ML algorithms in order to improve beam management. However, even though a straightforward ML solution would able to improve beam management performance significantly, there is some room for improvements, one being that algorithm sometimes chose a beam actually is a side lobe to another main lobe, that is, leakage from another beam. This is because the side lobes at some time points have the highest signal power compared with the other beams which makes the side lobe seem like the optimal choice. However, these side lobes are often unstable and cause non-optimal long-term results which the algorithm did not take into consideration. An improved solution is desired to

- Reduce unnecessary consumption of energy, or communication overheads, where the saved energy can be used in other areas to optimize efficiency.
- Reduce strength in transmission signal, where user should have the best signal for optimal performance.

For covering different operating conditions, beamforming can be provided in different ways. For example, a transceiver may employ narrow beams and wide beams selectively for achieving different purposes.

If a side lobe is selected because it has the strongest signal power in the current UE location, the main lobe of that same wide beam is probably directed in an angle more or less far away from the UE location, and so will the narrow beams (related to the wide beam) that are swept at beam refinement/tracking.

The UE might get good coverage from some of the narrow beams, if the side lobes of the narrow beams overlap the side lobe of the wide beam. But the situation does not seem optimal, if there is another wide beam main lobe with good coverage in the same UE location.

Note, proprietary solutions exist to prevent a switch to a wide beam with better wide beam coverage but worse narrow beam coverage (than the currently used narrow beam). However, for example at random access and initial beam refinement, there is no previous beam to compare with and the strongest wide beam will be selected regardless of side or main lobe.

It is therefore a desire to provide an approach for improving beam selection. In this disclosure there is suggested a way to provide beam coverage models which enhance the beam selection.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' realization that beam coverage models need to be created and updated to make the models relevant to the actual environment in which UEs and radio network node of the communication system operate. The inventors suggest a ML or artificial intelligence (AI) solution where a beam coverage model handler acts on measurement information and provides one or more models to a radio network node. In particular, the disclosure relates to a mechanism for information exchange between the radio network node and the beam coverage model handler, and the radio network node and beam coverage model handler involved. An achievement by this approach is that models are provided to avoid beam selection based on anomalies in coverage which may degrade performance over time.

According to a first aspect, there is provided a mechanism for handling information exchange between a radio network node and a beam model handler according to claims below.

According to a second aspect, there is provided a radio network node according to claims below.

According to a third aspect, there is provided a beam model handler according to claims below.

According to a fourth aspect, there is provided a method of information exchange according to claims below.

According to a fifth aspect, there is provided a computer program comprising instructions which, when executed on a processor of an interface causes the interface to perform the method according to the fourth aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

There has been precedent work within Ericsson which has investigated how a ML method could be used in order to improve beam management for 5G NR to potentially optimize beam measurements and efficiently use that to find the best beam for single user equipment (UE) and multiple UE's. This would in theory yield stronger signals and better transmissions between a radio network node and UE. A feed forward neural network was used in this work and did successfully perform the beam management measurements. For static environments, their algorithm had very high accuracy in terms of narrow beam prediction with a low average reference signal receive power, RSRP, drop compared to the baseline. For moving environments, the algorithm was able to achieve a surprisingly high cell throughput growth for more connected UE's. Furthermore, for the high-speed environments, they were able to achieve acceptable throughput performance.

The proposed further improved solution is to apply AI (or the like) with the objective of identifying the side lobes and other coverage anomalies from for example reflections of the beams. This would then be applied to possibly prevent the UE's to connect to those beams and choose a main lobe instead, given that the signal of that main lobe is not too weak. The term "too weak" in this context might be that the average throughput over some time is lower than for the side lobes and reflections.

The operation includes one or more of:

Automatically identify side lobes using AI or the like

Automatically identify beam anomalies/reflections using AI or the like

Incorporate the information given of the above to increase beam management performance The technical benefit of the improvement of beam management is that choices of unstable and non-optimal long-term connections between radio network node and UE will be avoided, thus resulting in a lower energy consumption. Notice that the unstable connections occur twice, connecting to the side lobe as well as connecting back to the main lobe. Side lobes occur due to the design of antennas and are inevitable but can be minimized.

In general, a side lobe should be avoided. It is likely that the UE will stay on a side lobe for a short amount of time only, yielding unnecessary beam switches that cost communication overheads and may degrade performance.

It is possible to generalize the proposed solution and make it applicable for wide beams as well as narrow beams. From here, however, the focus, for the sake of easier understanding, will be on wide beams only.

Figure 1:
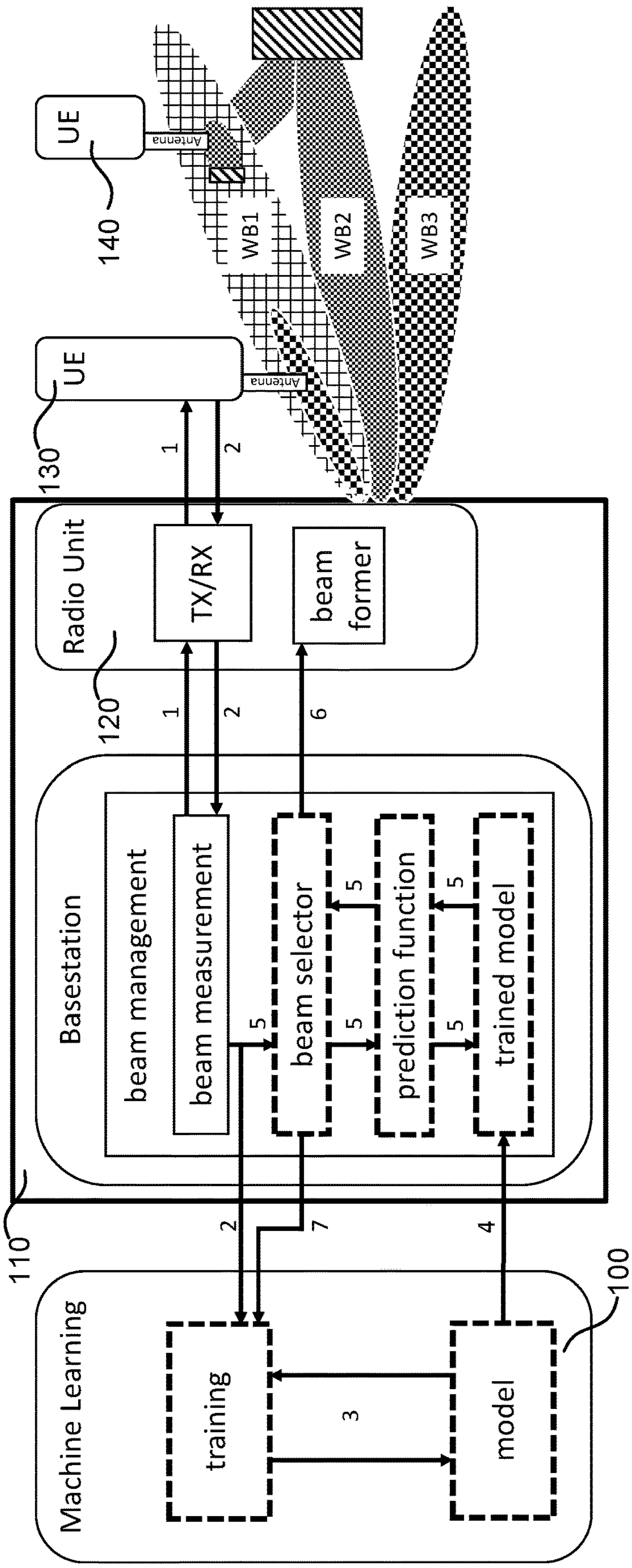
FIG. 1 is a block diagram depicting the system and functionality particularly related to this disclosure.

FIG. 1 is a block diagram depicting the system and functionality particularly related to this disclosure distributed in the bold/dashed units. Note, for the sake of not obscuring the main teaching of the diagram, only one side lobe is depicted (belonging to wide beam 3) to show a situation of overlapping main and side lobes. In a real setup all wide beams have a main lobe and multiple side lobes. Here, it is to be noted that a basestation, also referred to a radio network node 110, handles beam management and the beams are then physically provided by a radio unit 120 which includes an antenna arrangement suitable for the creation of beams. A beam model handler 100, as discussed above, employs some flavour of machine learning to provide the basestation with models, created or updated, for improving beam selection. The beam model handler 100 may be an integrated part of the radio network node 110, but a likely implementation is to put its functionality in a server remote from the radio network node 110. Such a server may provide beam model handling for a plurality of radio network nodes.

The beam model handler 100 may for example operate as a beam coverage model handler, i.e. the created/updated models are coverage centric. Further approaches for models, and hybrids thereof, are further demonstrated below.

Following steps describes a method to detect coverage anomalies, for example side lobes or an area within a main lobe with weaker signal strength due to for example shadowing.

1. The UE performs measurements on the broadcasted Wide Beams, e.g. observing reference signal in synchronization signal blocks, SSBs.
2. A list of wide beam measurements and available correlated data is sent to a beam coverage model handler comprising e.g. a Machine Learning module.
3. Continuous training of the beam coverage model handler, for example applying unsupervised clustering methods on the received data to build clusters representing the strongest wide beam, or main and side lobes or other coverage anomalies.

Several models or cluster sets can be built based on different aspects of the same input data, and used in combinations to take decisions:

A. "main"+"non-main" coverage clusters

Build a model for each wide beam describing their individual coverage map. Naturally a wide beam will be included in the measurement report where the beam has relatively good coverage, from its main lobe and possibly side lobes or more scattered coverage islands. Clusters will then represent these coverage areas, the largest (in space) cluster can be considered the "main cluster" (most likely the main lobe) and the remaining "non-main clusters" (side lobes or anomalies).

B. "strongest beam" clusters

Clusters can be built based on the actual strongest wide beam in a model common for all wide beams, i.e., a cluster represents an area where a particular wide beam is the strongest.

C. "used beam" clusters

Another possible variant is to build clusters based on what beam is selected/used in an area.

For the sake of easier understanding, a clustering example based on FIG. 1 is presented here:

For wb2 (wide beam 2), "main" and "non-main" clusters would be created for its main lobe and side lobes. The smaller area within wb1, where wb2 is the strongest due to shadowing of wb1 and reflection of wb2, could either become a part of wb2's main cluster or a separate non-main cluster (depends on the relative strength of other wide beams in the area in-between the shadow and the reflection point, i.e., whether wb2 will be included in measurement reports or not, if not there will be cluster separation).

4. Based on some criteria, the trained model, stored locally in a beam management function of the radio network node, is updated.
5. The same data as in step 2 is sent to the beam selector, the prediction function determines if a wide beam measurement is from a main lobe or a side lobe or other anomaly.
6. Depending on the use case, a suitable wide beam is selected, see use case example below.
7. The beam selector informs the beam model handler which beam that was selected, preferably accompanied by the beam measurements and/or associated data on which the beam selection decision was based.

A use case will now be presented as an example implementation with the aim to avoid using coverage anomalies in beam management. Reference is still made to FIG. 1 for easier understanding. At the leftmost UE location, wb1 will be selected even though wb3 (side lobe) is reported as the strongest in the measurement report from the UE. The decision to down-prioritize the measurement from wb3 can be based on that it belongs to a "non-main" cluster of wb3. Similarly at the rightmost location, wb1 will be selected even though wb2 (coverage island) is stronger, the decision can be either that it belongs to a "non-main" cluster of wb2 or that it is inside a larger "strongest beam" cluster composed of wb1 data.

Note, before down-prioritizing a wide beam, an additional condition can be applied to make sure the delta signal strength from the strongest (wb2/3) to the weaker (wb1) is within a certain limit. Here, one or more thresholds for signal strength/quality may be applied for proper operation.

Figure 2:
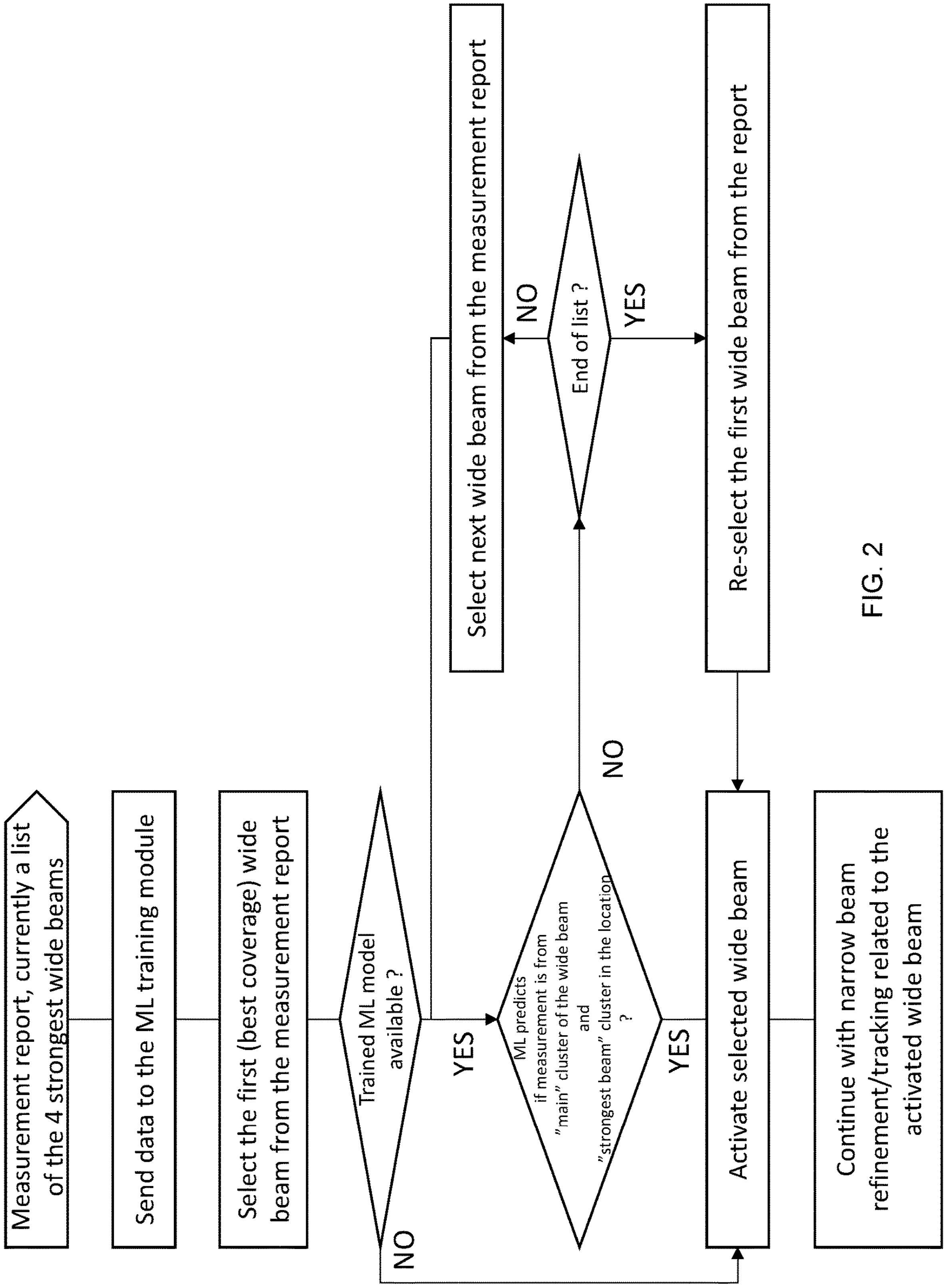
FIG. 2 is a flow chart illustrating a method according to an embodiment.

FIG. 2 is a flow chart illustrating the use case described above. For example, a measurement report may comprise a list of 4 strongest beams and is sent over an interface to the beam coverage model handler and is conveyed to a training module of an ML mechanism. A first beam is selected from the measurement report by the beam selector of the radio network node 110 illustrated in FIG. 1. This first beam may be the seemingly best covering beam. It is checked by the beam selector whether a trained ML model is available for coverage of that beam. If so, the beam coverage model handler predicts whether measurements of the measurement report is from a main cluster of a wide beam and strongest beam cluster of the location, and if so the beam selector activates the selected beam, and the beam handler then continues with narrow beam refinement or tracking related to the activated wide beam. If the beam coverage model handler predicts that measurements of the measurement report is not from a main cluster of a wide beam and strongest beam cluster of the location, a next wide beam of a list from the measurement report is selected, if more beams are on the list and the prediction of whether the measurement report is from a main cluster of a wide beam and strongest beam cluster of the location until the list is through or it has been predicted that it is from the main cluster and strongest beam cluster in the location. If no prediction of a main cluster of a wide beam and strongest beam cluster of the location could be predicted, the first (initially seeming the best) beam is re-selected and activated. If initially no model is available for the seemingly best beam, that beam is selected anyway.

Figure 3:
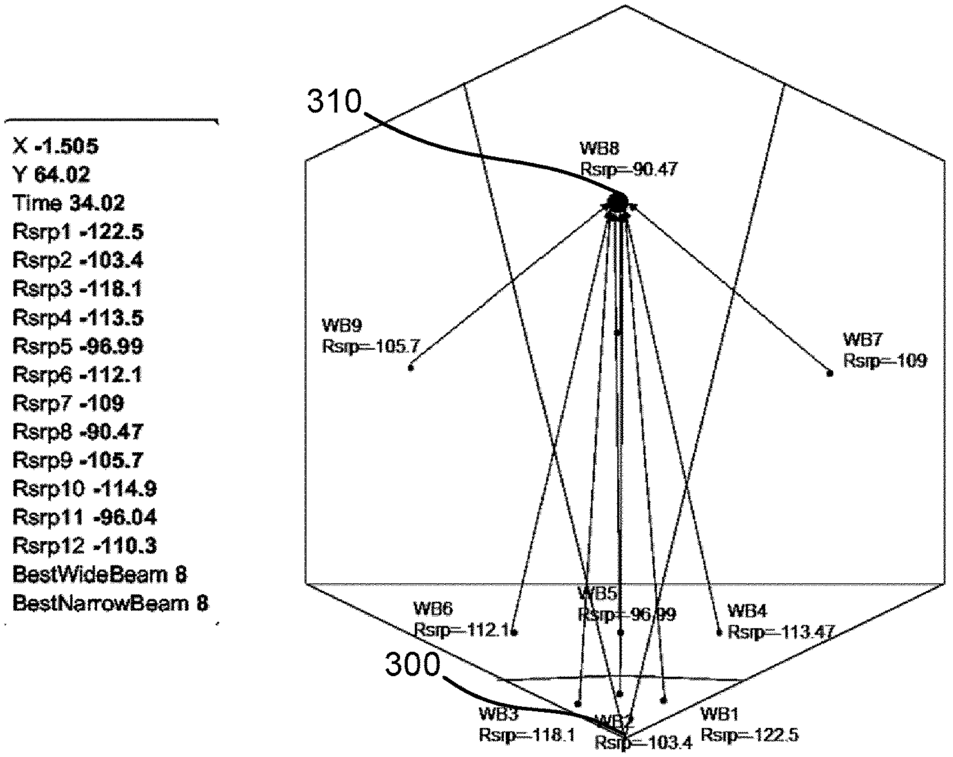
FIG. 3 is a diagram illustrating an area divided into fields where each field is a part of the area mainly covered by a corresponding beam.

FIG. 3 is a diagram illustrating an area divided into fields (1 to 9 denoted WB1 to WB9) where each field is a part of the area mainly covered by a corresponding beam. The radio network node is assumed being located in the lower part of the area 300 and a UE providing measurements is located at upper centre part 310. The position of the UE is considered known, at least by estimate, by the UE and/or radio network node. For example angle-of-arrival and/or time-of-arrival for signals can be used for the estimation. The UE measures, from e.g. reference signals of each beam, signal properties. The UE may from properties of the received signals know from which beam a signal emanates. For example, from a performed simulation, the UE finds that received power of reference signals from the nine beams are, in order of their numbering, −122.5, −103.4, −118.1, 113.5, −96.99, −112.1, −109.0, −90.47, −105.7, −114.9, −96.04, and −110.3 dB. These measurements, or at least a subset of them, e.g. the four strongest, are reported to the radio network node which uses the acquired data for modelling as described above.

Figure 4:
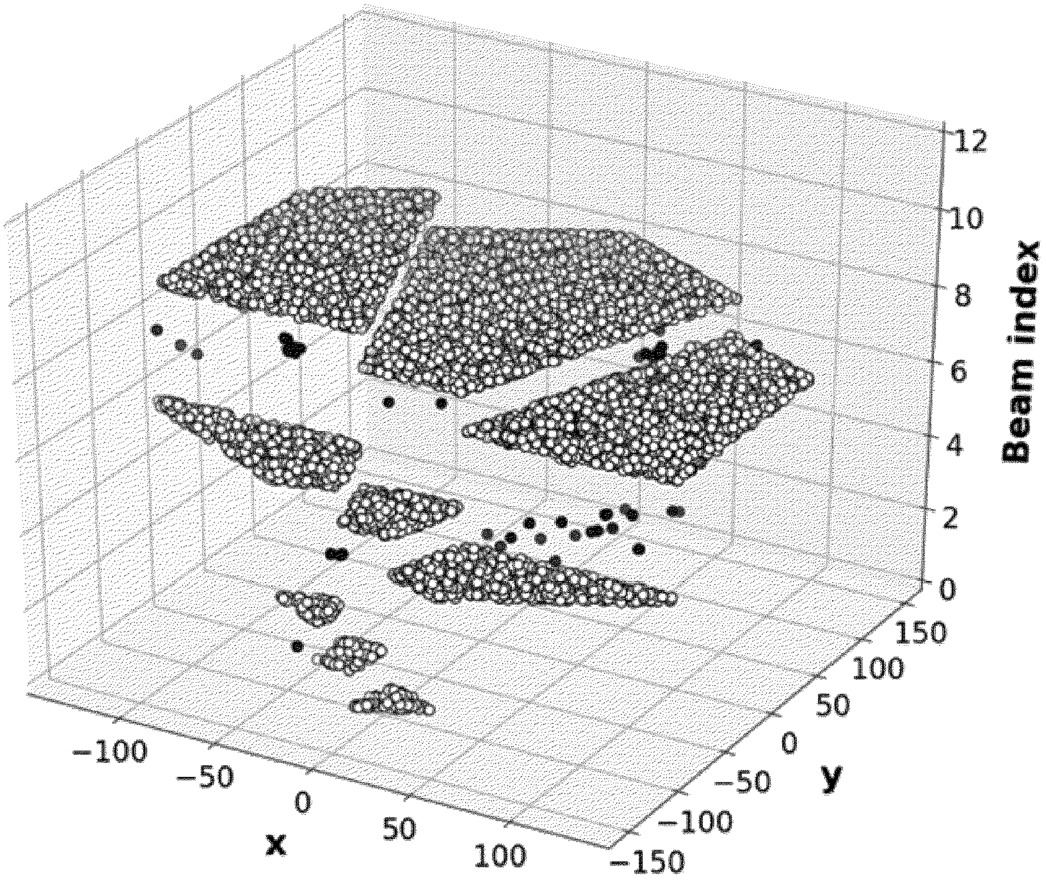
FIG. 4 is a diagram illustrating clusters of samples made at different UE locations and for different beams, and reported as strongest signal.

FIG. 4 is a diagram illustrating clusters of samples made at different UE locations and for different beams, and reported as strongest signal. In addition to the seemingly distinct clusters, outlier samples parted from the clusters are also shown, which correspond to reception of sidelobes, occasional reflections, etc. Through ML, anomalies causing these outliers can be detected. They are preferably labelled through a classifier which enables an ever-improving detection of outliers. Here, by observing received signal strength, angle-of-arrival, delay spread and/or time-of-arrival for signals it can be estimated whether the reception corresponds to an outlier.

The result of distinguishing measurements belonging to the clusters, i.e. providing stable connection, from outliers, providing less stability, is that a suitable beam can be selected.

Figure 5:
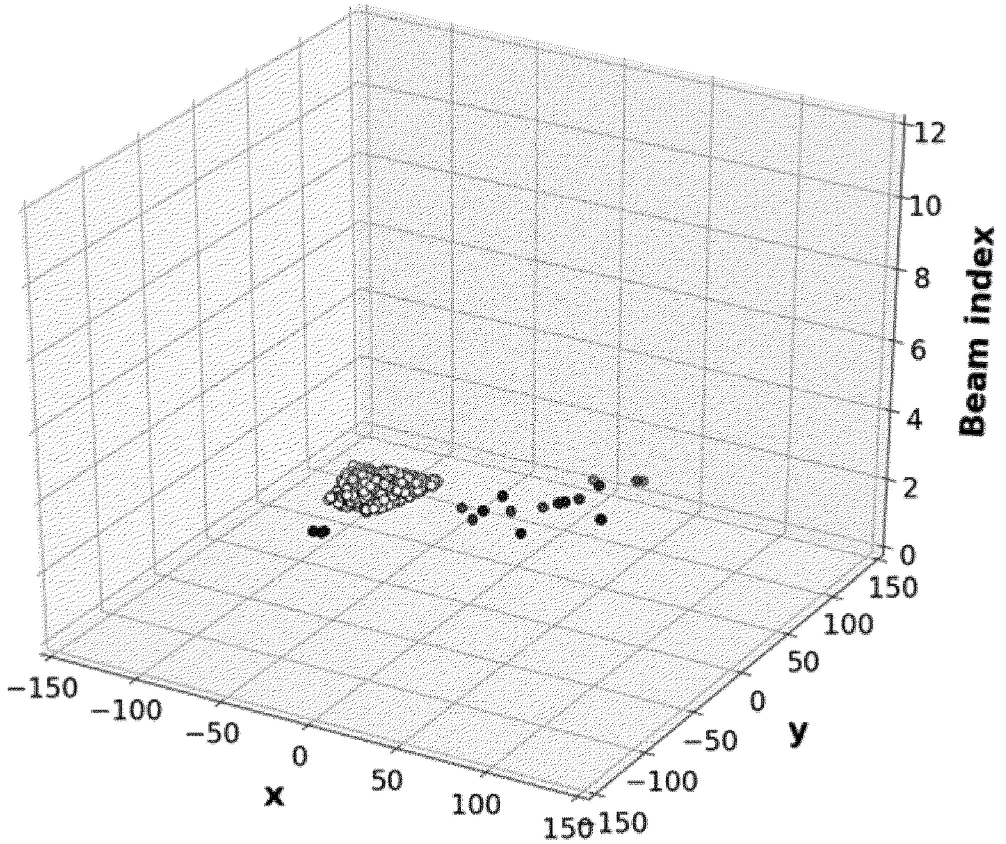
FIGS. 5 and 6 are similar diagrams as FIG. 4 but focused on single beams.
Figure 6:
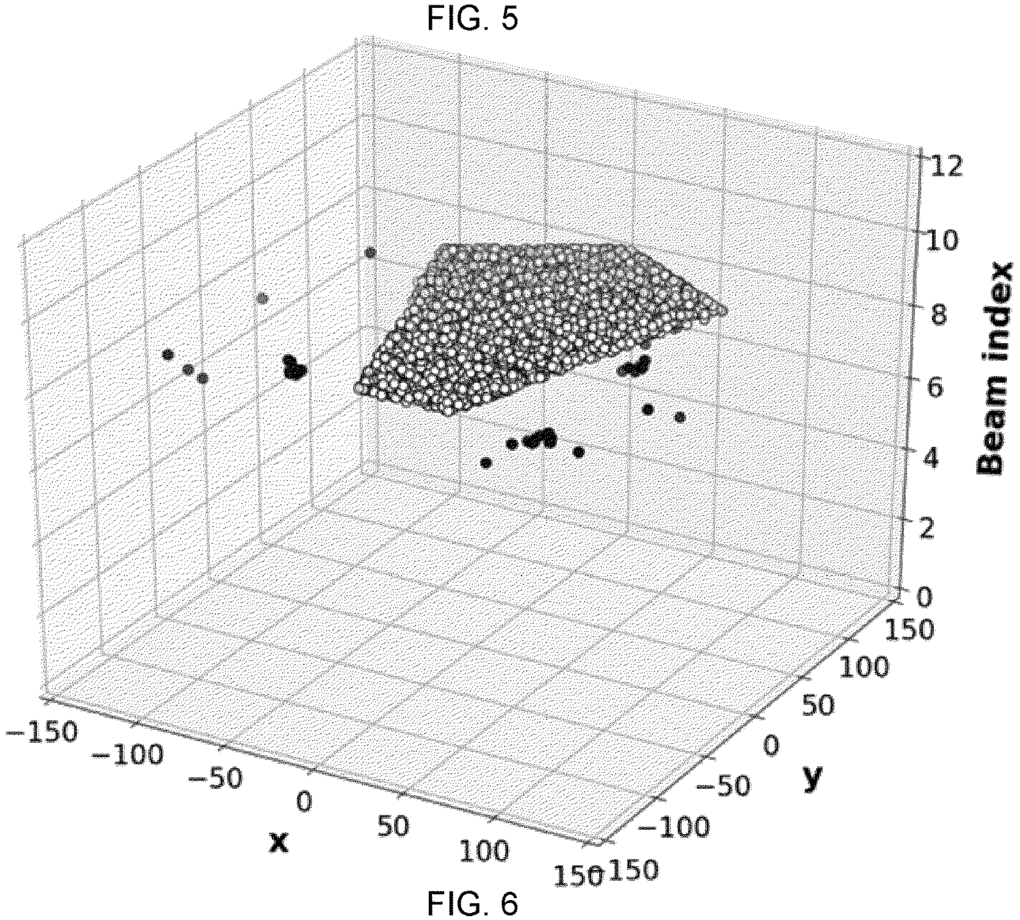

FIG. 5 is a similar diagram as FIG. 4, but focused on beam 5 and its outliers. FIG. 6 show the similar view for beam 8. Beams 5 and 8 show the most number of outliers in this simulation, which is natural since they are in the centre of the set of beams (and no adjacent beam sets were included in the simulation). Thus, observations of beams 5 and 8 are the most interesting for this analysis. The ML algorithm is thus arranged to learn that positions in areas related to the clustered earlier samples are proper samples for the beam while measurements in positions distant therefrom but having the beam index as of the clustered measurements, as the outliers, are probably not.

The ML approach is thus enabled to provide a model update/creation. The model can comprise one or more of coverage model per beam, strongest beam model, and/or used beam model. The coverage model per beam provides a kind of map of how a beam propagates in the actual environment and in relation to other beams in the same environment. Issues like shadows, reflections, sidelobes may be considered together with main information about main lobe, line-of-sight coverage, etc. The strongest beam model provides a corresponding map about which beam is the strongest at positions, e.g. as those illustrated by a cluster above, and may provide for continuous coverage areas to avoid frequent beam switching. The used beam model provides a corresponding map of earlier working map assignments for positions. The models can be combined for smooth operation of reliable communication and avoiding beam switching that may degrade network performance and/or UE energy consumption, or providing beam switching that improves network performance and/or UE energy consumption. For the sake of easier reading, the different models or combinations thereof are referred to as beam model.

With this said, the model making/updating may further be biased in sense of prioritized benefits. Prioritizing may also vary, e.g. depending on load, time of day, etc. for providing efficient network utilization and/or user experience.

Returning to FIG. 1, emphasizing the parts shown in bold lines, the benefits of this disclosure are provided through the information exchange ranging from UE reports to model creation/update. In particular, a module 110 for the model update/creation, which may be integrated in the radio network node 120 or be implemented remotely, as discussed above, needs to get information about actual measurements and provide information about created/updated models. This is referred to as a beam model handler 110. It is therefore provided a mechanism for handling information exchange between the radio network node 120 and the beam model handler 100. The mechanism comprises a first interface providing at least a set of signal property measurements, for a plurality of wireless communication devices 130, 140 being in communication with the radio network node 110, from the radio network node 110 to the beam model handler 100. The mechanism further comprises a second interface providing one or more beam models from the beam model handler to the radio network node 110. The set of signal property measurements may comprise a signal power or quality measurement for each measured beam. The measured beams are those, for each measuring UE 130, 140, that have measurements reported. Each measurement thus emanates from a wireless communication device among the wireless communication devices being in communication with the radio network node.

The beam model may comprise coverage information for a main lobe of a beam, and a set of coverage data for anomalies associated with the main lobe of the beam, as discussed for a beam coverage model above, or any combination model including features as of the beam coverage model. The anomalies associated with the main lobe of the beam may comprise for example coverage information for side lobes of the beam, coverage information for static or semi-static reflections of the beam, coverage information for recurring dynamic reflections of the beam, etc., or any combination thereof.

The radio network node is arranged to communicate with the plurality of wireless devices using beamforming as discussed above. Association of respective wireless device to a beam is controlled through a beam model. The radio network node comprises the mechanism for handling information exchange between the radio network node and the beam model handler.

The beam model handler is arranged to create or update beam coverage models based on signal property measurements for a plurality of wireless communication devices being in communication with the radio network node. The beam model handler comprises the mechanism for handling information exchange between the radio network node and the beam model handler.

Here, the interested reader asks whether the mechanism belongs to the beam model handler or to the radio network node. As will be understood from this disclosure as a whole, both are true. The mechanism needs functionality implemented on both entities for proper function. Any suitable division of the mechanism is feasible as long as the parts at each entity fit with its corresponding entity for information exchange.

Figure 7:
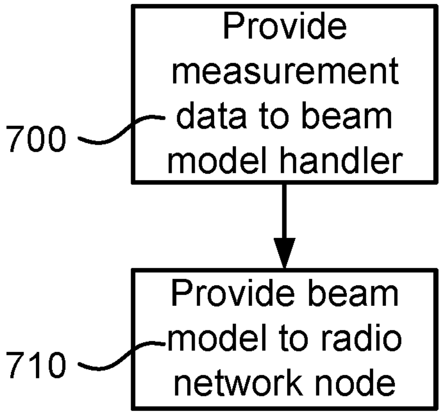
FIG. 7 is a simplified flow chart illustrating a method at the information exchange mechanism according to embodiments.

FIG. 7 is a simplified flow chart illustrating a method at the information exchange mechanism. The method of information exchange between the radio network node and the beam model handler comprises providing 700 at least a set of signal property measurements, for the plurality of wireless communication devices being in communication with the radio network node, from the radio network node to the beam model handler, and providing 710 one or more beam models from the beam model handler to the radio network node. The set of signal property measurements comprises a signal power or quality measurement for each measured beam, wherein the measurement emanates from a wireless communication device among the wireless communication devices being in communication with the radio network node. The beam model handler may be provided with further information, as discussed above, for further improving creation/update of the beam models.

Figure 8:
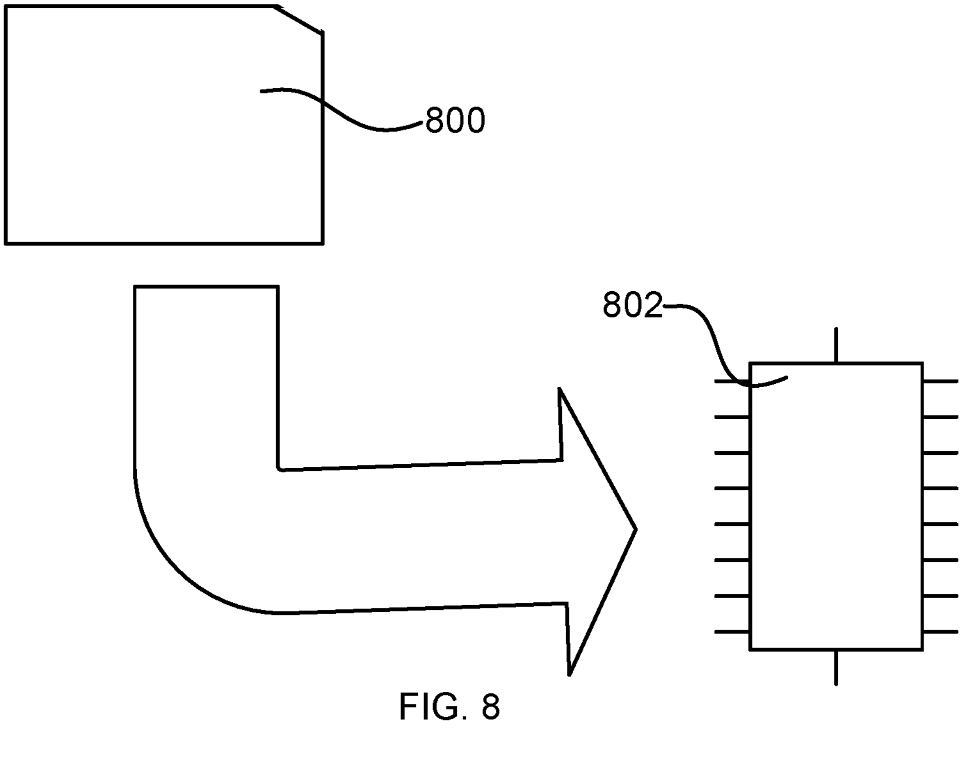
FIG. 8 schematically illustrates a computer-readable medium and a processing device.

The methods according to the present disclosure are suitable for implementation with aid of processing means, such as computers and/or processors, especially for the case where the interfaces 911 and 931 demonstrated below comprise processors handling information exchange. Therefore, there is provided computer programs, comprising instructions arranged to cause the processing means, processor, or computer to perform the steps of any of the methods according to any of the embodiments described with reference to FIGS. 2 and 7. The computer programs preferably comprise program code which is stored on a computer readable medium 800, as illustrated in FIG. 8, which can be loaded and executed by a processing means, processor, or computer 802 to cause it to perform the methods, respectively, according to embodiments of the present disclosure, preferably as any of the embodiments described with reference to FIGS. 2 and 7. The computer 802 and computer program product 800 can be arranged to execute the program code sequentially where actions of the any of the methods are performed stepwise, or be performed on a real-time basis. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Figure 9:
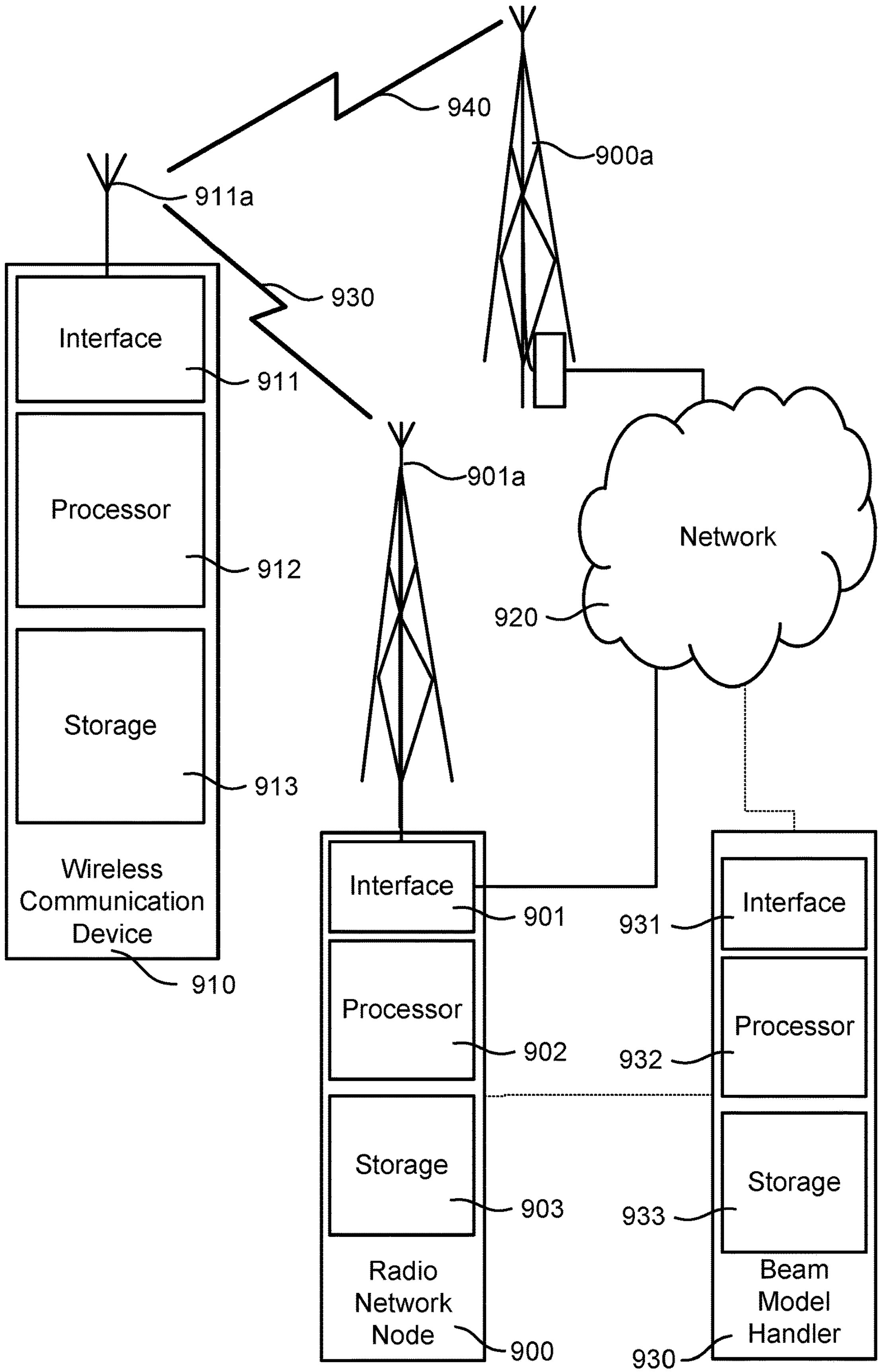
FIG. 9 illustrates a wireless network including network nodes, a beam model handler, and a wireless communication device.

FIG. 9 illustrates an example of a wireless network comprising radio network (NW) nodes 900 and 900*a* and a wireless communication device 910 with a more detailed view of the network node 900 and the communication device 910 in accordance with an embodiment. For simplicity, FIG. 9 only depicts core network 920, network nodes 900 and 900*a*, and communication device 910. Network node 900 comprises a processor 902, storage 903, interface

901, and antenna 901*a*. Similarly, the communication device 910 comprises a processor 912, storage 913, interface 911 and antenna 911*a*. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 920 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. The network 920 may comprise a network node for performing the method demonstrated with reference to FIG. 8, and/or an interface for signalling between network nodes 900, 900*a*.

The network node 900 comprises a processor 902, storage 903, interface 901, and antenna 901*a*. These components are depicted as single boxes located within a single larger box. In practice however, a network node may comprise multiple different physical components that make up a single illustrated component (e.g., interface 901 may comprise terminals for coupling wires for a wired connection and a radio transceiver for a wireless connection). Similarly, network node 900 may be composed of multiple physically separate components (e.g., a NodeB component and an RNC component, a BTS component and a BSC component, etc.), which may each have their own respective processor, storage, and interface components. In certain scenarios in which network node 900 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 900 may be configured to support multiple radio access technologies (RATs). In such embodiments, some components may be duplicated (e.g., separate storage 903 for the different RATs) and some components may be reused (e.g., the same antenna 901*a* may be shared by the RATs).

The processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 900 components, such as storage 903, network node 900 functionality. For example, processor 902 may execute instructions stored in storage 903. Such functionality may include providing various wireless features discussed herein to a wireless device, such as the wireless device 910, including any of the features or benefits disclosed herein.

Storage 903 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 903 may store any suitable instructions, data or information, including software and encoded logic, utilized by the network node 900. the storage 903 may be used to store any calculations made by the processor 902 and/or any data received via the interface 901.

The network node 900 also comprises the interface 901 which may be used in the wired or wireless communication of signalling and/or data between network node 900, network 920, and/or wireless device 910. For example, the interface 901 may perform any formatting, coding, or translating that may be needed to allow network node 900 to send and receive data from the network 920 over a wired connection. The interface 901 may also include a radio transmitter and/or receiver that may be coupled to or a part of the antenna 901*a*. The radio may receive digital data that is to be sent out to other network nodes or wireless devices via a wireless connection. The radio may convert the digital data into a radio signal having the appropriate channel and bandwidth parameters. The radio signal may then be transmitted via antenna 901*a* to the appropriate recipient (e.g., the wireless device 910).

The antenna 901*a* may be any type of antenna capable of transmitting and receiving data and/or signals wirelessly through beamforming. In some embodiments, antenna 901*a* may comprise one or more antenna arrangements operable to transmit/receive radio signals between, for example, 2 GHz and 66 GHz. An antenna arrangement may be used to transmit/receive beamformed radio signals from devices within a particular area. The antenna 901*a* may comprise a plurality of elements for enabling different beamforming operations such as providing wide or narrow beams in different directions.

The wireless device 910 may be any type of communication device, wireless device, UE, D2D device or ProSe UE, station (STA), etc. but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 900 and/or other wireless devices. In particular, the wireless device 910 is capable of communication as demonstrated above, e.g. in a context of providing the desired measurements. The wireless device 910 comprises a processor 912, storage 913, interface 911, and antenna 911*a*. Like the network node 900, the components of the wireless device 910 are depicted as single boxes located within a single larger box, however in practice a wireless device may comprises multiple different physical components that make up a single illustrated component (e.g., storage 913 may comprise multiple discrete microchips, each microchip representing a portion of the total storage capacity).

The processor 912 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 910 components, such as storage 913, wireless device 910 functionality. Such functionality may include providing various wireless features discussed herein, including any of the features or benefits disclosed herein.

The storage 913 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 913 may store any suitable data, instructions, or information, including software and encoded logic, utilized by the wireless device 910. The storage 913 may be used to store any calculations made by the processor 912 and/or any data received via the interface 911.

The interface 911 may be used in the wireless communication of signalling and/or data between the wireless device 910 and the network nodes 900, 900*a*. For example, the interface 911 may perform any formatting, coding, or translating that may be needed to allow the wireless device 910 to send and receive data to/from the network nodes 900, 900*a* over a wireless connection. The interface 911 may also include a radio transmitter and/or receiver that may be coupled to or a part of the antenna 911*a*. The radio may receive digital data that is to be sent out to e.g. the network node 901 via a wireless connection. The radio may convert the digital data into a radio signal having the appropriate channel and bandwidth parameters. The radio signal may then be transmitted via the antenna 911*a* to e.g. the network node 900.

The antenna 911*a* may be any type of antenna capable of transmitting and receiving data and/or signals wirelessly. In some embodiments, antenna 911*a* may comprise one or more omnidirectional, sector or panel antennas operable to transmit/receive radio signals between 2 GHz and 66 GHz. For simplicity, antenna 911*a* may be considered a part of interface 911 to the extent that a wireless signal is being used. The antenna 911*a* may comprise one or more elements for enabling different ranks of SIMO, MISO or MIMO operation, or beamforming operations.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 912 and/or 902, possibly in cooperation with the storage 913 and/or 903. The processors 912 and/or 902 and the storage 913 and/or 903 may thus be arranged to allow the processors 912 and/or 902 to fetch instructions from the storage 913 and/or 903 and execute the fetched instructions to allow the respective functional module to perform any features or functions disclosed herein. The modules may further be configured to perform other functions or steps not explicitly described herein but which would be within the knowledge of a person skilled in the art.

A beam model handler 930 comprises a processor 932, storage 933, and interface 931, wherein the interface is either arranged to communicate with one or more radio network nodes 900, 900*a* directly or via the network 920, as illustrated by the dashed lines. These components are depicted as single boxes located within a single larger box. In practice however, a beam model handler 930 may comprise multiple different physical components that make up a single illustrated component (e.g., interface 931 may comprise terminals for coupling wires for a wired connection and a radio transceiver for a wireless connection). Similarly, beam model handler 930 may be composed of multiple physically separate components (e.g., one or more servers, a network interfacing circuit, a processor array, etc.), which may each have their own respective processor, storage, and interface components. In certain scenarios in which beam model handler 930 comprises multiple separate components, one or more of the separate components may be shared among several beam model handlers. For example, a single beam model handler 930 may support multiple NodeBs. In some embodiments, beam model handler 930 may be configured to support multiple radio access technologies (RATs) each having their own parameter sets available. In such embodiments, some components may be duplicated (e.g., separate storage 903 for the different RATs) and some components may be reused (e.g., the same processor array may be shared by the RATs).

The processor 932 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other beam model handler 930 components, such as storage 933, beam model handler 930 functionality. For example, processor 932 may execute instructions stored in storage 933. Such functionality may include providing various beam model creation/update features discussed herein to associated radio network nodes 900, 900*a*, including any of the features or benefits disclosed herein.

Storage 933 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 933 may store any suitable instructions, data or information, including software and encoded logic, utilized by the beam model handler 930. the storage 933 may be used to store any calculations made by the processor 932 and/or any data received via the interface 931.

The beam model handler 930 also comprises the interface 931 which may be used in the wired or wireless communication of signalling and/or data between network node 900, network 920, and/or beam model handler 930. For example, the interface 931 may perform any formatting, coding, or translating that may be needed to allow beam model handler 930 to send and receive data from the network 920 over a wired connection. The interface 931 is preferably arranged as demonstrated above for information exchange for enabling ML beam model creation/update.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A mechanism for handling information exchange between a radio network node and a beam model handler, the mechanism comprising:

a first interface providing at least a set of signal property measurements, for a plurality of wireless communication devices being in communication with the radio network node, from the radio network node to the beam model handler; and a second interface providing one or more beam models from the beam model handler to the radio network node, the one or more beam models comprising coverage information for a main lobe of a beam, and a set of coverage data for anomalies associated with the main lobe of the beam and the anomalies associated with the main lobe of the beam comprising at least one of:

coverage information for side lobes of the beam;

coverage information for static or semi-static reflections of the beam; and coverage information for recurring dynamic reflections of the beam.

2. The mechanism of claim 1, wherein the set of signal property measurements comprises a signal power or quality measurement for each measured beam, wherein the measurement emanates from a wireless communication device among the wireless communication devices being in communication with the radio network node.

3. A radio network node arranged to communicate with a plurality of wireless devices using beamforming, association of respective wireless device to a beam being controlled through a beam model, the radio network node comprising:

a mechanism for handling information exchange between the radio network node and a beam model handler, the mechanism comprising:

a first interface providing at least a set of signal property measurements, for a plurality of wireless communication devices being in communication with the radio network node, from the radio network node to the beam model handler; and a second interface providing one or more beam models from the beam model handler to the radio network node, the one or more beam models comprising coverage information for a main lobe of a beam, and a set of coverage data for anomalies associated with the main lobe of the beam and the anomalies associated with the main lobe of the beam comprising at least one of:

coverage information for side lobes of the beam;

coverage information for static or semi-static reflections of the beam; and coverage information for recurring dynamic reflections of the beam.

4. The radio network node of claim 3, wherein the set of signal property measurements comprises a signal power or quality measurement for each measured beam, wherein the measurement emanates from a wireless communication device among the wireless communication devices being in communication with the radio network node.

5. A beam model handler arranged to create or update beam models based on signal property measurements for a plurality of wireless communication devices being in communication with a radio network node, the beam model handler comprising:

a mechanism for handling information exchange between the radio network node and the beam model handler, the mechanism comprising:

a first interface providing at least a set of signal property measurements, for a plurality of wireless communication devices being in communication with the radio network node, from the radio network node to the beam model handler; and a second interface providing one or more beam models from the beam model handler to the radio network node, the one or more beam models comprising coverage information for a main lobe of a beam, and a set of coverage data for anomalies associated with the main lobe of the beam and the anomalies associated with the main lobe of the beam comprising at least one of:

coverage information for side lobes of the beam;

coverage information for static or semi-static reflections of the beam; and coverage information for recurring dynamic reflections of the beam.

6. The beam model handler of claim 5, wherein the set of signal property measurements comprises a signal power or quality measurement for each measured beam, wherein the measurement emanates from a wireless communication device among the wireless communication devices being in communication with the radio network node.

7. A method of information exchange between a radio network node and a beam model handler, the method comprising:

providing at least a set of signal property measurements, for a plurality of wireless communication devices being in communication with the radio network node, from the radio network node to the beam model handler; and providing one or more beam models from the beam model handler to the radio network node, the one or more beam models comprising coverage information for a main lobe of a beam, and a set of coverage data for anomalies associated with the main lobe of the beam and the anomalies associated with the main lobe of the beam comprising at least one of:

coverage information for side lobes of the beam;

coverage information for static or semi-static reflections of the beam; and coverage information for recurring dynamic reflections of the beam.

8. The method of claim 7, wherein the set of signal property measurements comprises a signal power or quality measurement for each measured beam, wherein the measurement emanates from a wireless communication device among the wireless communication devices being in communication with the radio network node.

* * * * *